US005146825A

United States Patent [19]

Dehari

[11] Patent Number: 5,146,825

[45] Date of Patent: Sep. 15, 1992

[54] MOTOR-DRIVEN CHOP SAW HAVING IMPROVED LOWER BLADE GUARD ARRANGEMENT

[75] Inventor: Tomoshige Dehari, Hiroshima, Japan

[73] Assignee: Ryobi Ltd., Hiroshima, Japan

[21] Appl. No.: 731,600

[22] Filed: Jul. 17, 1991

[30] Foreign Application Priority Data

Jul. 31, 1990 [JP] Japan .............................. 2-81943[U]

[51] Int. Cl.[5] .............................................. B23D 45/14

[52] U.S. Cl. ........................................ 83/397; 83/478; 83/DIG. 1; 83/486.1

[58] Field of Search ................. 83/478, 490, 397, 546, 83/581, DIG. 1, 471.3, 486.1; 30/390, 391; 144/251 R, 251 A, 251 B, 216

[56] References Cited

U.S. PATENT DOCUMENTS

| | | | |
|---|---|---|---|
| 3,787,973 | 1/1974 | Beisch et al. | 30/391 |
| 4,152,961 | 5/1979 | Batson | 83/486.1 |
| 4,537,105 | 8/1985 | Bergler | 83/486.1 |
| 4,774,866 | 10/1988 | Dehari et al. | 83/478 |
| 4,799,416 | 1/1989 | Kumasaka et al. | 83/490 |
| 4,805,504 | 2/1989 | Fushiya et al. | 83/478 |
| 4,934,233 | 6/1990 | Brundage et al. | 83/471.3 |
| 5,020,406 | 6/1991 | Sasaki et al. | 83/581 |

FOREIGN PATENT DOCUMENTS

| | | | |
|---|---|---|---|
| 0379322 | 7/1990 | European Pat. Off. | 83/581 |
| 63-110316 | 7/1988 | Japan . | |

*Primary Examiner*—Frank T. Yost
*Assistant Examiner*—Allan M. Schrock
*Attorney, Agent, or Firm*—Sughrue, Mion, Zinn, Macpeak & Seas

[57] ABSTRACT

A chop saw arrangement having an improved lower blade guard pivoting mechanism. An upper safety guard is pivotally supported to a hinging member, and a circular saw blade is rotatably supported to the upper safety guard. A collar is attached to the upper safety guard, and a swingable arm pivotally connected to a supporting arm has a cam portion engageable with the collar. Angular position of the swingable arm is defined by the abutment between the cam and the collar. The swingable arm has an end portion pivotally connected to one end of a link member whose other end is pivotally connected to a lower blade guard. The lower blade guard is pivotally supported to the upper safety guard coaxially with the circular saw blade. Angular position of the lower blade guard is defined by the pivotal movement of the swingable arm through the link member.

8 Claims, 7 Drawing Sheets

MOTOR-DRIVEN CHOP SAW HAVING IMPROVED LOWER BLADE GUARD ARRANGEMENT

BACKGROUND OF THE INVENTION

The present invention relates to a motor-driven chop saw having a lower blade guard arrangement, and more particularly to a lower blade guard arrangement in the chop saw, which is pivotally mounted for movement between a raised rest position and a lowered operational position.

A conventional chop saw generally provides an upper safety guard which partially encases a circular saw blade, and a swingable lower blade guard which covers the exposed portion of the saw blade when the saw is in the raised rest position. When the upper safety guard is pivotally moved to the lowered operational position about a pivot shaft, the swingable lower blade guard is rotated to expose the saw blade portion so as to chop a wooden or metal workpiece mounted on a saw table with the circular saw blade.

During the chopping, the exposed area of the saw blade must be as small as possible for the purpose of safety. Thus, the lower blade guard must sufficiently cover the exposed portion even during the chopping. For this, commonly U.S. Pat. No. 4,774,866 discloses a lower blade guard provided rotatably about a rotation axis of the circular saw blade, and a link mechanism for pivotally moving the lower blade guard in response to cut infeed motion of the circular saw blade so that the exposed area of the saw blade is minimized even during a chopping operation.

However, according to the conventional lower blade guard arrangement disclosed in the U.S. Patent, an optimum pivotally moving or displacing distance may not be obtainable in response to the pivotal motion of the circular saw blade due to the structure of the link mechanism. Further, it would be difficult in the conventional arrangement to control an amount of movement of the lower blade guard in accordance with various cutting position of the circular saw blade. For example, the lower blade guard may abut the workpiece even if the circular saw blade per se can still perform chopping (even if the circular saw blade can still further be pivotally moved downwardly). Due to the interference of the lower blade guard with the workpiece, further chopping work cannot be performed. Alternatively, due to inappropriate relationship between the swinging displacement of the circular saw blade and the pivotal displacement of the lower blade guard, the area of the exposed blade portion becomes temporarily large during chopping work, which incurs increased danger to an operator.

SUMMARY OF THE INVENTION

It is therefore, an object of the present invention to provide a chop saw having an improved lower blade guard swinging mechanism.

Another object of the invention is to provide such mechanism capable of providing large angular movement of the lower blade guard.

Still another object of the invention is to provide the mechanism in which intended or controlled pivotal movement can be provided in accordance with workpiece size and material without any interference of the lower blade guard with the workpiece.

These and other objects of the invention will be attained by providing a chop saw having (a)a saw table, (b) a main chopping portion positioned on the saw table and consisting of a drive motor, a circular saw blade drivingly connected to the drive motor and rotatable about a center axis, and an upper safety guard for covering a generally upper half portion of the circular saw blade, (c) a pivot portion for pivotally moving the main chopping portion to pivotally move the circular saw blade between its upper rest position and a lower chopping position, (d) a lower blade guard pivotally movable about the center axis, and (e) a lower blade guard pivotting mechanism having a replaceable swingable arm having one end detachably and pivotally supported to the pivot portion and another end. The swingable arm is provided with a cam portion, a link member having one end detachably and pivotally connected to the another end of the swingable arm and another end pivotally connected to the lower blade guard, and a collar member fixed to the main chopping portion and slidable with respect to the cam portion of the swingable arm, the collar member being movable in accordance with the pivotal movement of the main chopping portion, to angularly move the swingable arm through the cam portion, to thereby angularly move the lower blade guard.

Since the pivotal position of the lower blade guard is regulated by the pressure contact between the collar and the cam portion of the swingable arm, the pivotal position can be controlled by changing the configuration of the cam portion in accordance with the variation in chopping position dependent on a thickness of a workpiece. Intended pivotal movement is obtainable by replacing one swingable arm with a second swingable arm whose cam portion has a configuration different from that of the first swingable arm.

DETAILED DESCRIPTION OF THE PREFERRED EMBODIMENTS

Figure 1:
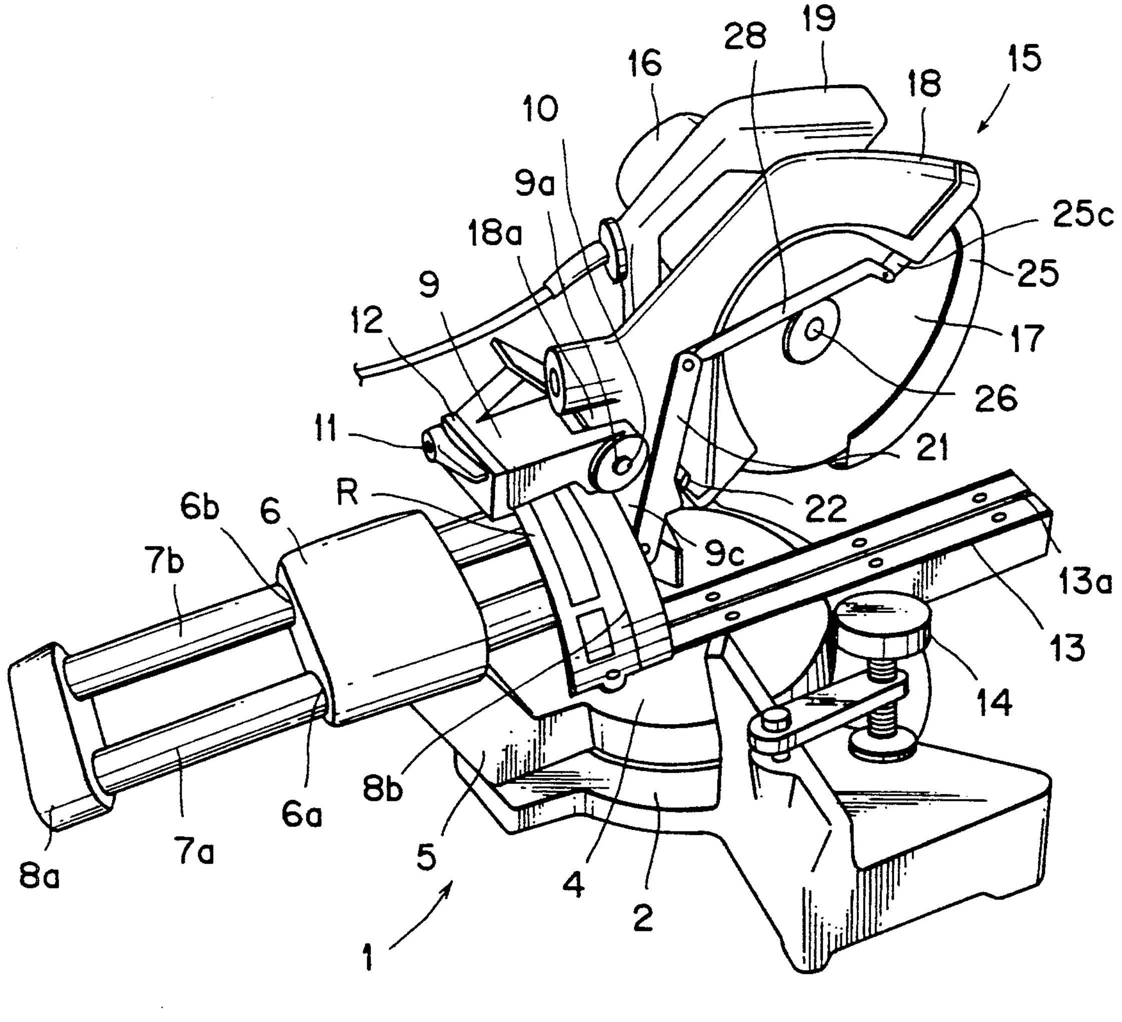
FIG. 1 is a perspective view showing a motor-driven chop saw incorporating a saw blade guard arrangement according to a first embodiment of this invention.
Figure 2:
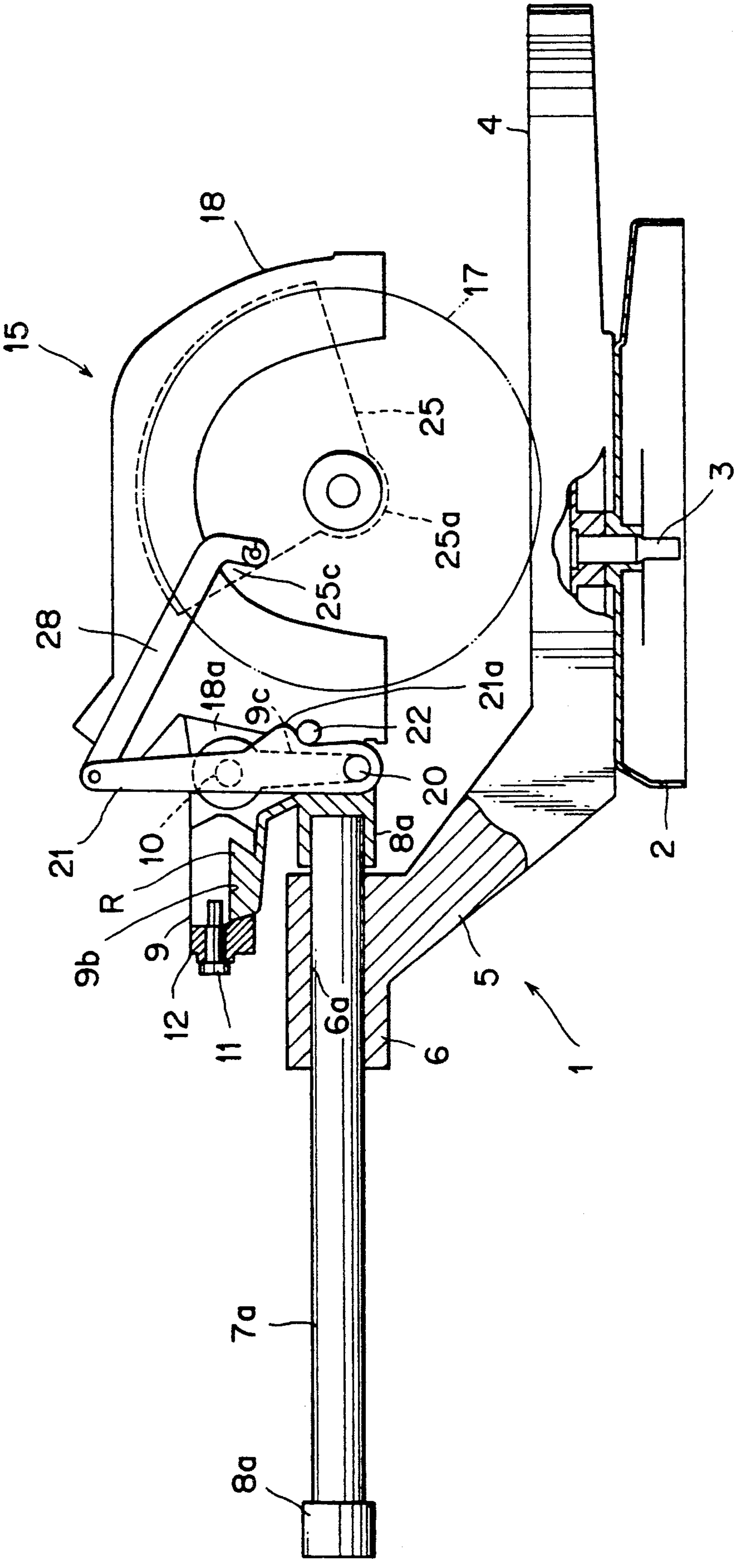
FIG. 2 is a side elevational view partially cross-sectioned showing the motor-driven chop saw of FIG. 1.

A saw blade guard arrangement for a chop saw according to a first embodiment of this invention will be described with reference to FIGS. 1 through 4. As shown in FIGS. 1 and 2, a chop saw has a saw table 1 including a stationary base 2 and a turn table 4 rotatably mounted thereon about a vertical shaft 3 (FIG. 2). A support arm 5 extends from the turn table 4, and has a tip end portion provided with a bushing 6. The bushing 6 is formed with two bores 6*a*, 6*b* through which a pair of slidable rods 7*a*, 7*b* slidably extend. These slidable rods 7*a*, 7*b* have rear and front end portions coupled together by couplings 8*a*, 8*b*. At an upper surface of the front couplings 8*b*, an arcuate guide R is provided. The arcuate guide R is provided by an upwardly protruded arcuate protrusion having trapezoidal cross-section as best shown in FIG. 2. The front coupling 8*b* serves as a support means for supporting a circular saw blade 17, its driving means, an upper safety guard 18 and a lower blade guard 25. Upon movement of the slidable rods 7*a*, 7*b* in an axial direction thereof, a chopping position of the circular saw blade 17 is controllable.

A hinging member 9 is positioned above the front bushing 8*b*. The hinging member 9 has a front portion formed with a hole 9*a* through which a hinging shaft 10 extends. The hinging member 9 has a rear portion fixed with a pressure contact plate 12 through a locking bolt 11. Further, the hinging member 9 has a lower portion formed with a notch 9*b*. The notch 9*b* and the pressure contact member 12 define a dovetail shaped groove engageable with the arcuate guide R of the front coupling 8*b*. The hinging member 9 can be fixed to a desired position on the front coupling 8*b* by firstly releasing the locking bolt 11, and moving the hinging member 9 along the arcuate guide R, and then clamping the locking bolt 11 so as to control orientation of the circular saw blade 17 with respect to a vertical plane. Incidentally, a flat safety plate 13 is embedded in the table in flash therewith and extends frontwardly from the table 4, and a linear groove 13*a* is formed in the safety plate 13 for allowing a lower portion of the circular saw blade 17 to pass therethrough. Further, a clamp means 14 is provided to the base 2 for fixing a workpiece W (see FIG. 3) to the turn table 4.

A reference numeral 15 designates an essential chopping portion supported on the saw table 1. The chopping portion 15 includes a drive motor 16, and the circular saw blade 17 driven by the drive motor 16, the upper safety guard 18 for covering a generally upper half portion of the circular saw blade 17, and a manipulation handle 19 fixed to one side of the upper safety guard 18. The drive motor 16 is mounted on a side wall of the manipulation handle 19, and a drive shaft of the drive motor 16 is connected to a center shaft 26 on which the circular saw 17 is rotatably mounted.

Figure 4:
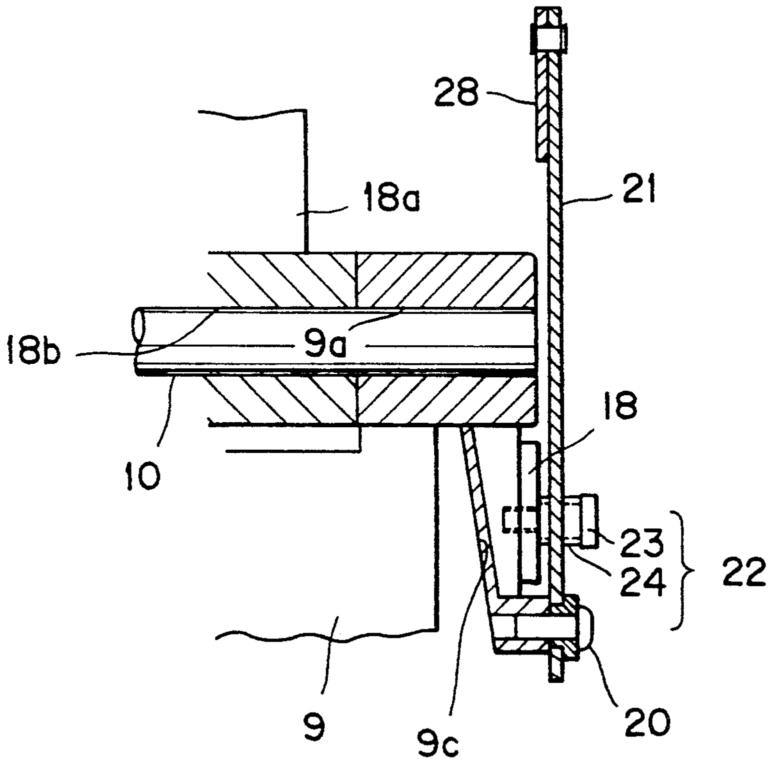
FIG. 4 is a cross-sectional view taken along a line IV—IV of FIG. 3.

A rear end of the upper safety guard 18 is provided with a hinged portion 18*a* at which a bore 18*b* is formed for allowing the hinging shaft 10 to pass therethrough as shown in FIG. 4. Therefore, the upper safety guard 18 is provided pivotally movable in a vertical direction about the hinging shaft 10 together with the circular saw 17, the handle 19 and the drive motor 16. Further the upper safety guard 18 is pivotally urged about the shaft 10 upwardly by a spring (not shown).

Figure 3:
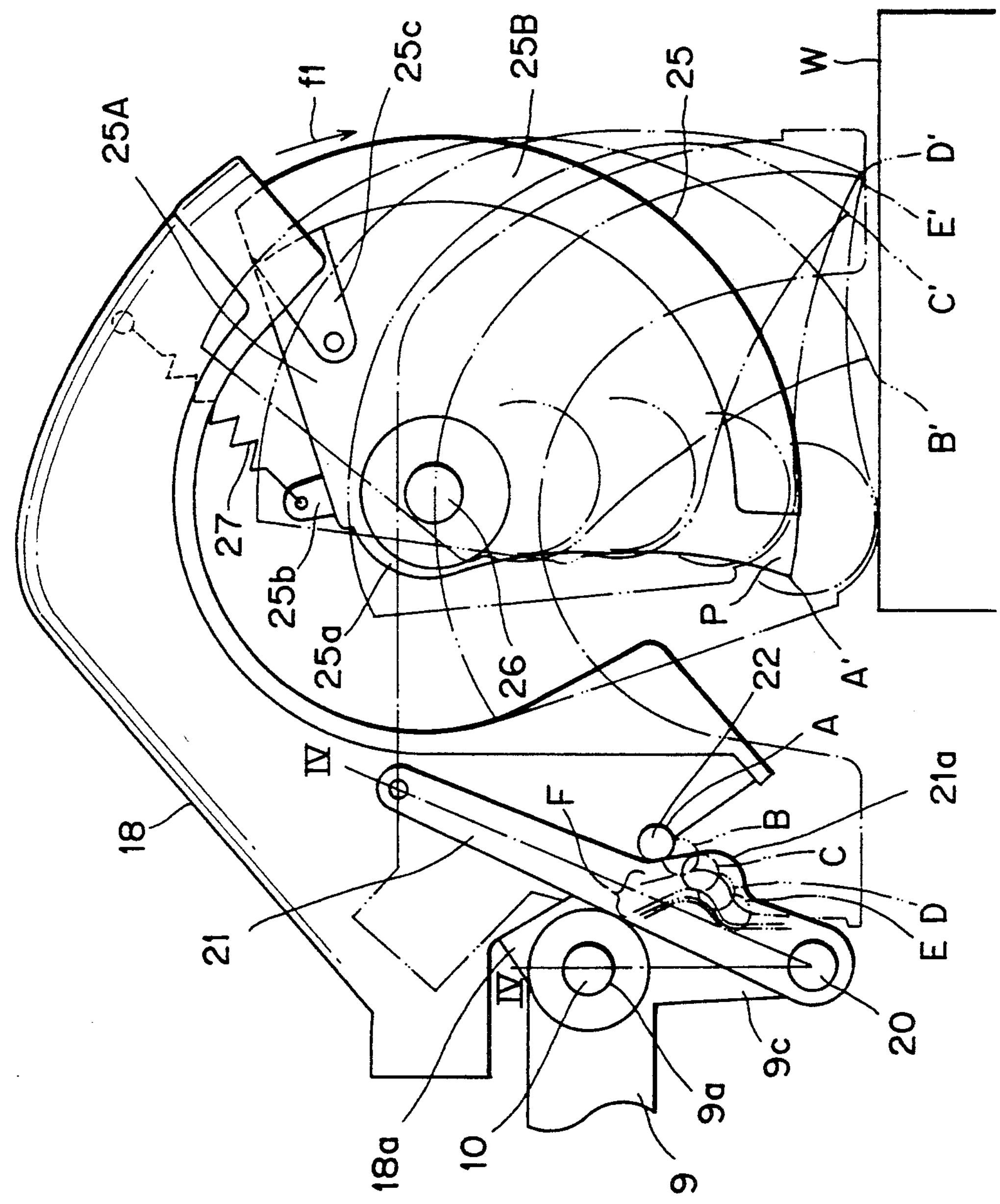
FIG. 3 is a side elevational view for description of operation of the saw blade guard arrangement according to the first embodiment.

Next, a lower blade guard arrangement will be described. The hinging member 9 which supports the hinging shaft 10 is provided with a support arm 9*c* extending downwardly from the hinging member 9. The support arm 9*c* has a free end provided with a pivot shaft 20, to which one end of a swingable arm 21 is detachably and pivotably supported. The swingable arm 21 has a front side face formed with a slidable projection or a cam portion 21*a*. The slidable projection 21*a* projects frontwardly as shown in FIGS. 1 through 3. Further, another side of the upper safety guard 18 is provided with a laterally extending collar 22 in pressure contact with the slidable projection 21*a*. The collar 22 should provide an outer configuration so as to provide a smooth slide contact with the projection 21*a*. Therefore, in the depicted embodiment, the collar 22 includes a thread member 23 in threading engagement with the other side of the upper safety guard 18 and a roller 24 rotatably mounted on the thread member 23 for rolling contact with the slidable projection 21*a*.

Another end portion of the swingable arm 21 is detachably and pivotally connected to one end of a link 28 (see FIG. 2) whose other end is pivotally connected to the lower blade guard 25. The lower blade guard 25 has one side (the side the same as the one side of the upper safety guard 18) provided with a sector portion 25A. The sector portion 25A is pivotally supported to the center shaft 26, so that the lower blade guard 25 is provided coaxial with the circular saw blade 17. The sector portion has a front end provided with a bracket 25*b*, and a tension spring 27 is provided between the bracket 25*b* and the upper safety guard 18 so as to normally rotate the lower blade guard 15 in a direction indicated by an arrow f1. The lower blade guard 25 has a peripheral end portion provided with a bent rib 25B positioned at another side thereof for covering an exposed teeth of the circular saw blade. At the front end portion of the bent rib 25B, a bracket 25*c* extends radially inwardly for pivotal engagement with another end portion of the link 28 (see FIG. 1). Thus, because of the pivotal motion of the swingable arm 21, the lower blade guard 25 is pivotable about the center shaft 26 through the link 28. In any times, the front face of the swingable arm 21, i.e., the projection 21*a* is urged toward the collar 22 because of the biasing force of the spring 27.

With this structure, the workpiece W (FIG. 3) is mounted on the turn table 4, and is clamped thereon, if necessary, by the clamp means 14. Then, the manipulation handle 19 is manipulated to pivotally move the essential chopping portion 1 downwardly about the hinging shaft 10 so as to move the circular saw 17 downwardly toward the workpiece W for chopping.

During the chopping operation, the upper safety guard 18 is gradually moved downwardly and therefore, the collar 22 is moved in an arcuate locus about the hinging shaft 10 from a position A to position E shown in FIG. 3. Because of the arcuate movement of the collar 22, the swingable arm 21 is also pivotally moved about the pivot shaft 20 as shown by two dotted chain lines in FIG. 3, since the projection 21*a* of the arm 21 is always urged toward the collar 22 by the spring 27. During this pivotal motion of the swingable arm 21, the relative positional relationship between the swingable arm 21 and the collar 22 is changed, so that the collar 22 gradually rides over the projection 21*a* and is positioned downwardly with respect to the projection 21*a* while maintaining sliding contact therewith. In other words, in accordance with the pivotal movement of the upper safety cover 18, the swingable arm 21 is pivotally moved about the pivot shaft 20, the pivotal movement being dependent on an outer contour of the slidable projection 21*a*.

The pivotal displacement of the swingable arm 21 is transmitted to the lower blade guard 25 through the link 28, so that the lower blade guard 25 is also pivotally moved about the center shaft 26. Thus, a rear end point P of the lower blade guard 25 is moved from a position A' to a position D' as shown in FIG. 3. More specifically, the rear end point P of the lower blade guard 25 can be positioned immediately above a top surface of the workpiece W irrespective of the further downward movement of the circular saw 17 even during the chopping operation. Accordingly, exposed area of the circular saw blade 17 can be maintained in a minimum level even during the chopping operation without any abutment of the lower blade guard to the workpiece W.

Upon completion of the chopping operation, the manipulation handle 19 is lifted upwardly, so that the essential chopping portion 15 is pivotally moved upwardly and reaches its rest position in cooperation with a biasing force of the spring (not shown). In this case, the lower blade guard 25 also restores its original angular position because of the reversal motions of the swingable arm 21 and the link 28 by the reversal motion of the collar 22.

According to the first embodiment of this invention, chopping ability with respect to the thickness of the workpiece W can be controlled by changing the contour of the slide projection 21*a* of the swingable arm 21. In other words, various swingable arms 21 can be interchanged. In this case, there is no limitation which restrains the shape or contour of the slidable projection 21*a*, but any shape of the projection 21*a* can be obtained by machining swingable arm 21. Therefore, a great displacing amount of the lower blade guard 25 is obtainable, and optimum moving locus of the rear end point P is obtainable by controlling the shape or contour of the slide projection 21*a* in accordance with the type and thickness of the workpiece.

Figure 5:
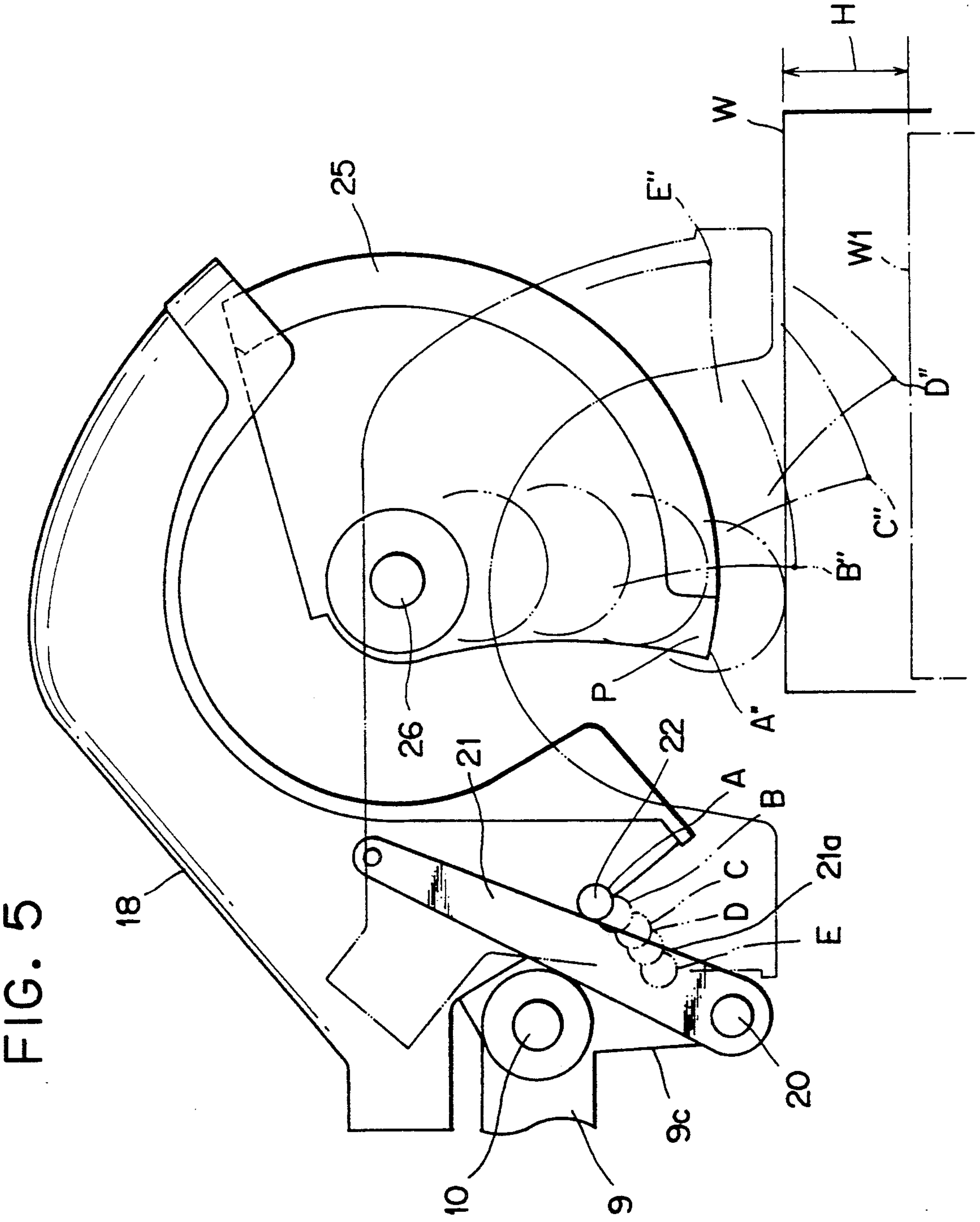
FIG. 5 is a schematic side elevational view showing a saw blade guard arrangement proposed through in-house R & D activities toward the present invention.

For the purpose of comparison in movement of the lower blade guard, FIG. 5 shows one arrangement proposed through R & D activities by the inventor. According to the proposed arrangement, the slidable portion in sliding contact with the collar is not arcuately formed but is linearly formed. In other words, no corresponding projection 21*a* of the first embodiment is provided. With this arrangement, in accordance with the downward movement of the collar 22 along an arcuate locus from a position A to a position E, the rear end point P of the lower blade guard 25 is moved from a position A" to a position E". The position D" is the lowermost position, and therefore, resultant chop saw can not perform chopping to a workpiece W (since the rear point P abuts the workpiece W at its moving points B", C" and D"), but can perform chopping to a workpiece W1 whose thickness is smaller than that of the workpiece W by a height H. On the other hand, in the improved structure according to the first embodiment described above, the lower blade guard can be largely moved with proper covering relation to the circular saw blade in accordance with the position of the saw blade.

Next, a chop saw according to a second embodiment of this invention will be described with reference to FIG. 6, wherein like parts and components are designated by the same reference numerals and characters as those shown in the first embodiment. In the second embodiment, L-shaped support arm 9*c*' extends from a hinging member 9 which supports the chopping components such as the circular saw 17, the upper safety guard 18, the lower blade guard 25, etc. similar to the first embodiment. Further, a collar 22' extends laterally from an inner surface of the upper safety guard 18.

The L-shaped support arm 9*c*' has a free end integrally provided with a pivot shaft 20', and a horseshoe-shaped swingable arm 21' is pivotally mounted on the pivot shaft 20'. An inner end surface of the swingable arm 21' serves as a cam face 21*a*' in slidable contact with the collar 22'. The horseshoe-shaped swingable arm 21' has one end pivotably connecting one end of a link 28' whose other end is pivotally connected to the lower blade guard 25 through a pin 25*c*' provided integrally therewith. Further, a tension spring 50 is interposed between the upper safety guard 18 and the lever 28' for urging the lower blade guard in a direction to cover the lower half portion of the saw blade. It is also possible to interpose the tension spring between the upper safety guard 18 and directly to the lower blade guard 25 for the identical purpose.

Figure 6:
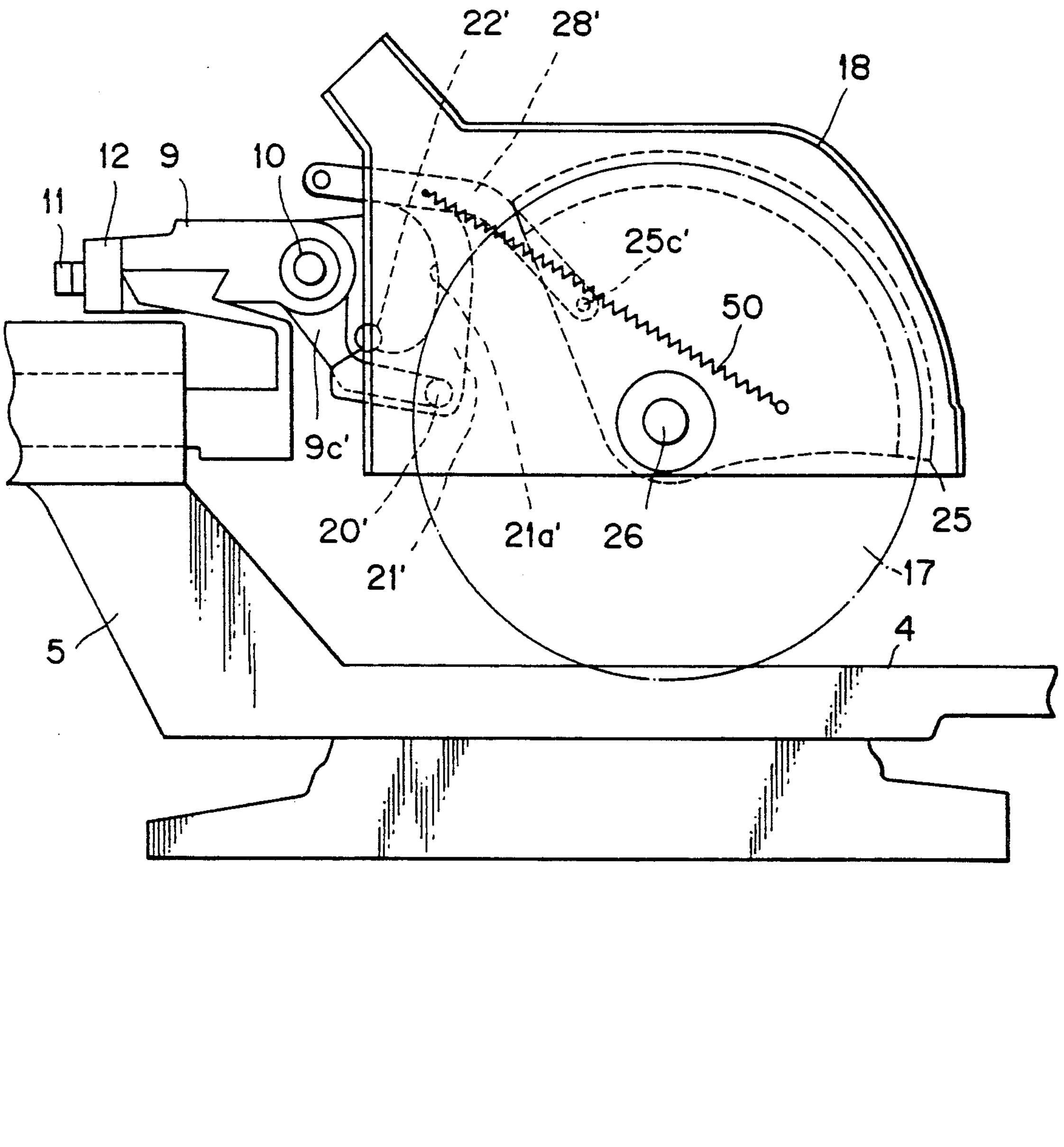
FIG. 6 is a side elevational view showing a motor driven chop saw according to a second embodiment of this invention.
Figure 7:
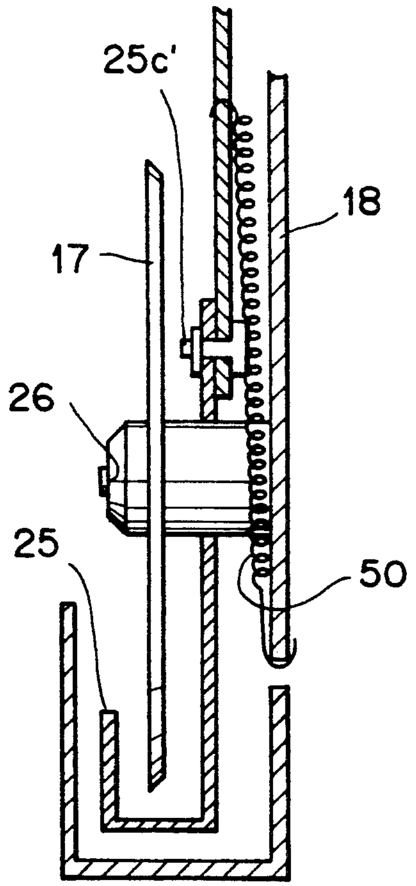
FIG. 7 is a plan cross-sectional view showing an internal arrangement of an upper safety guard according to the second embodiment of this invention.

FIG. 6 shows a chopping position of the chop saw The pivotal angular position of the lower blade guard 25 is provided by the engagement between the collar 22' and the U-shaped cam face 21*a*'. This engagement is maintainable by the biasing force of the tension spring 50. In this state, the lower blade guard 25 is positioned within the upper safety guard 18, so that the chopping can be made without any interference between the workpiece (not shown) and the lower blade guard. The chopping components are pivotally moved upwardly about the hinging shaft 10 to obtain a rest position thereof. In accordance with the upward movement of the upper safety guard 18, the collar 22' is also moved upwardly. Therefore, the collar 22' is brought to rolling contact with a U-shaped bottom portion of the cam face 21', and angle between the swingable arm 21' and the lever 28' is increased to angularly move the lower safety guard in a clockwise direction in FIG. 6. Thus, the lower blade guard 25 is brought to a position for covering the circular saw 17 portion, other than the portion covered by the upper safety guard 18.

In view of the foregoing, according to the blade guard arrangement in the chop saw of this invention, the lower blade guard can be largely displaced by controlling the contour of the slide contact portion of the swingable arm. Further, various and desired moving locus of the lower blade guard is obtainable in conformance with the kind or thickness of the workpiece by the optimum control of the relative positional relationship between the chopping portion and the lower blade guard.

While the invention has been described in detail and with reference to specific embodiment thereof, it would be apparent to those skilled in the art that various changes and modifications may be made therein without departing from the spirit and scope of the invention.

What is claimed is:

1. A chop saw comprising:

a saw table;

a main chopping mechanism positioned on said saw table and comprising a drive motor, a circular saw blade drivingly connected to said drive motor and rotatable about a center axis, and an upper safety guard for covering a generally upper half portion of said circular saw blade;

a pivot member positioned so as to pivotally move said main chopping mechanism between an upper rest position and a lower chopping position;

a lower blade guard pivotally movable about said center axis; and a lower blade guard pivoting mechanism comprising a replaceable swingable arm having a first end detachably and pivotally supported to the pivot member and, the swingable arm being provided with a cam surface;

a link member having one end detachably and pivotally connected to a second end of said swingable arm and another end pivotally connected to said lower blade guard; and a collar member fixed to said main chopping mechanism in and slidable contact with said cam surface, said collar member being movable in accordance with the pivotal movement of said main chopping portion, so as to angularly move said swingable arm by virtue of contact with said cam portion, to thereby angularly move said lower blade guard.

2. The chop saw as claimed in claim 1, wherein said swingable arm is one of a plurality of swingable arms, each having a cam surface that is different from one another, a desired one of said swingable arms being attached to said pivot member and to said first end of the link for obtaining angular movement of said lower blade guard in a desired manner.

3. The chop saw as claimed in claim 2, wherein said pivot member comprises a hinging member slidably mounted on said saw table, a pivot shaft rotatably extending through said hinging member and a coupling member comprising a support arm extending from said hinging member, said first end of said swingable arm being pivotally connected to said support arm.

4. The chop saw as claimed in claim 3, wherein said collar member is fixed to said upper safety guard.

5. The chop saw as claimed in claim 4, wherein said coupling member has an upper portion provided with an arcuate projection having a trapezoidal cross-section, and wherein said hinging member has a lower portion provided with a groove slidably engageable with said projection for controlling an orientation of said circular saw blade with respect to a vertical plane.

6. The chop saw as claimed in claim 4, wherein said swingable arm has is of a linear shape having an edge provided with said cam surface, said cam protruding therefrom so as to abut the collar portion.

7. The chop saw as claimed in claim 4, wherein said swingable arm is of a horseshoe-shape having an inner U-shaped surface defining said cam surface.

8. A chop saw as claimed in claim 6, wherein the second end of said swingable arm is movable in a direction opposite a moving direction of said main chopping mechanism, from said upper rest position to said lower chopping position, by virtue of contact of said collar member with said protruding cam.

* * * * *